US005577525A

United States Patent [19]

Wirfel et al.

[11] Patent Number: 5,577,525

[45] Date of Patent: Nov. 26, 1996

[54] THERMAL RELEASE APPARATUS FOR COUPLING A DAMPER ACTUATOR TO A DAMPER BLADE ASSEMBLY

[75] Inventors: Kevin L. Wirfel, Versailles; Samuel W. Holmes, Jr.; Ganeson Kandasamy, both of Lexington, all of Ky.

[73] Assignee: Johnson Service Company, Milwaukee, Wis.

[21] Appl. No.: 321,340

[22] Filed: Oct. 11, 1994

[51] Int. Cl.[6] .......... F16K 17/38

[52] U.S. Cl. .......... 137/75; 137/77

[58] Field of Search .......... 137/72, 75, 77, 137/79

[56] References Cited

U.S. PATENT DOCUMENTS

Re. 30,204 2/1980 Rovt .......... 137/77

*Primary Examiner*—John C. Fox

*Attorney, Agent, or Firm*—Harness, Dickey & Pierce, P.L.C.

[57] ABSTRACT

A thermal release coupler employed in a fire and smoke damper assembly, in which the fire and smoke damper assembly includes an array of damper blades carried in a damper frame, movable between open and closed positions, with a linkage joining the damper blades. A damper actuator operatively connected to the linkage drives the damper blade array between the open and closed positions. A drive coupler and a connecting coupler are formed from identical coupler units, carried respectively on a drive shaft from the actuator, and a connecting shaft that connects to the damper blade linkage. The connecting shaft is hollow and rotates on the drive shaft. Each coupler unit has a generally circular coupler body, with two connecting, circumferentially opposed ears. A drive post extends from one connecting ear, and a connecting post extends from the other ear. The two coupler units are oriented such that the drive post of each coupler unit extends toward the other coupler unit, and the coupler units are positioned such that their ends are coplanar A torsion spring, with legs attached to each coupler unit, is carried on the connecting shaft and extends between the drive coupler and the connecting coupler. A fusible link extends between the drive post and connecting post to maintain the connecting coupler connecting post in close proximity to the drive coupler drive post, separating at a rated temperature and allowing the spring to drive the damper array shut.

2 Claims, 1 Drawing Sheet

THERMAL RELEASE APPARATUS FOR COUPLING A DAMPER ACTUATOR TO A DAMPER BLADE ASSEMBLY

BACKGROUND OF THE INVENTION

The present invention relates generally to the field of fire protection equipment, and more specifically to the field of devices that control the flow of air and smoke within a building in the event of a fire, to affect the spread of fire in the structure.

When considering the ventilation system for a large building, the requirement to control airflow in the event of fire is self-evident. The basic solution to that problem was the fire damper, exemplified in U.S. Pat. No. Reissue 30,204, originally issue to Root in 1976. That disclosure is typical: A damper assembly, consisting of an array of damper blades movable between open and closed positions, is mounted in a ventilation duct. A tensioning means (a spring or the like) is connected to the damper blade array to hold the array in a closed position. Then the blade array is rotated to an open position and held there by a fusible link—a metallic element that would separate at a rated temperature, allowing the tensioning means to close the damper. Thus, the presence of fire near the damper would automatically result in shutting off the airflow in that portion of the ventilation system.

It was found, however, that a disproportionate amount of damage and injury in fire situations was caused by smoke, not by the flames themselves. Because fire dampers automatically shut off airflow, firefighters could not selectively use the ventilation system to exhaust smoke from portions of the building affected by the fire. The solution to that problem was the combination smoke/fire damper, as seen in U.S. Pat. No. 4,332,272, issued to Becelaere in 1984. There, the fusible link is dispensed with altogether. The blade array is still controlled by a tensioning spring, but a damper actuator operates against the spring torque to open the blade array. A temperature sensing device can automatically disconnect the damper actuator and close the blade array, but that device can be overridden, allowing fire fighters open the damper on command.

This approach suffers from two drawbacks. First, the damper actuator must always operate against the spring torque. That design requires wastes energy by requiring the motor to overcome the spring tension even when no fire is present. Second, this system fails to provide a failsafe closure method. Because an operator can always override the temperature sensor, the damper may well remain open not only in the presence of smoke (which may be desirable) but also in the presence of flames (which is never desirable).

The art has therefore only come halfway to meeting the challenge of controlling both fire and smoke. The present invention solves that problem by offering a system that allows full control of the damper array up to the point of a flame condition, without imposing a spring load on the damper actuator, while also providing the foolproof operation of a fusible link to insure shutoff at a rated fire temperature.

SUMMARY OF THE INVENTION

The broad objective of the present invention is to provide a thermal release coupler for a smoke/fire damper that offers reliable closure of a damper array in case of fire in proximity to the damper assembly yet does not load the damper actuator during normal operation.

Another object of the invention is to provide a thermal release coupler for a smoke/fire damper that can be manufactured at low cost from conventional materials.

A yet further object of the invention is to provide a thermal release coupler that can be used in both fire and combination smoke/fire damper applications.

These and other objects are achieved in the present invention, a thermal release coupler employed in a fire and smoke damper assembly. The fire and smoke damper assembly includes an array of damper blades carried in a damper frame, movable between open and closed positions, with a linkage joining the damper blades. A damper actuator operatively connected to the linkage drives the damper blade array between the open and closed positions. The thermal release coupler is a mechanism that transmits the driving force of the actuator to the damper blades. To that end, a drive shaft is operatively coupled to the damper actuator and a hollow connecting shaft is operatively connected to the damper blade linkage and rotatably carried on the drive shaft. A drive coupler and a connecting coupler are formed from identical coupler units. Each coupler unit has a generally circular coupler body, with two connecting ears projecting radially from the body at circumferentially opposed locations. A drive post extends from one connecting ear, perpendicular to the plane of the coupler body, and a connecting post extends from the other ear, also perpendicular to the plane of the coupler body but extending in a direction opposite from the direction of the drive post. Mounting pegs are carried on the ends of the drive post and the connecting post. A shaft aperture is formed at the central axis of the coupler body, and a spring aperture is formed at the base of each the connecting ear. The drive coupler is secured to and carried on the drive shaft, and the connecting coupler is carried on and secured to the connecting shaft. The two coupler units are oriented such that the drive post of each coupler unit extends toward the other coupler unit, and the coupler units are positioned such that the mounting pegs on one the coupler unit lie coplanar with the mounting pegs on the other coupler unit. A torsion spring is carried on the connecting shaft and extends between the drive coupler and the connecting coupler. Two spring legs extend longitudinally from each end of the spring and are carried in a spring aperture of the drive coupler and a the spring aperture of the connecting coupler, such that the spring exerts torque on the coupler units in a direction to drive the damper blades to the closed position. The spring legs are positioned such that the unloaded position of the spring urges the damper array to a fully closed position. A fusible link is carried on the drive coupler drive shaft mounting peg and the connecting coupler connecting post mounting peg to maintain the connecting coupler connecting post in close proximity to the drive coupler drive post.

FIG. is a pictorial illustrating a preferred embodiment of the thermal release coupler of the present invention.

DETAILED DESCRIPTION OF A PREFERRED EMBODIMENT

Figure 1:
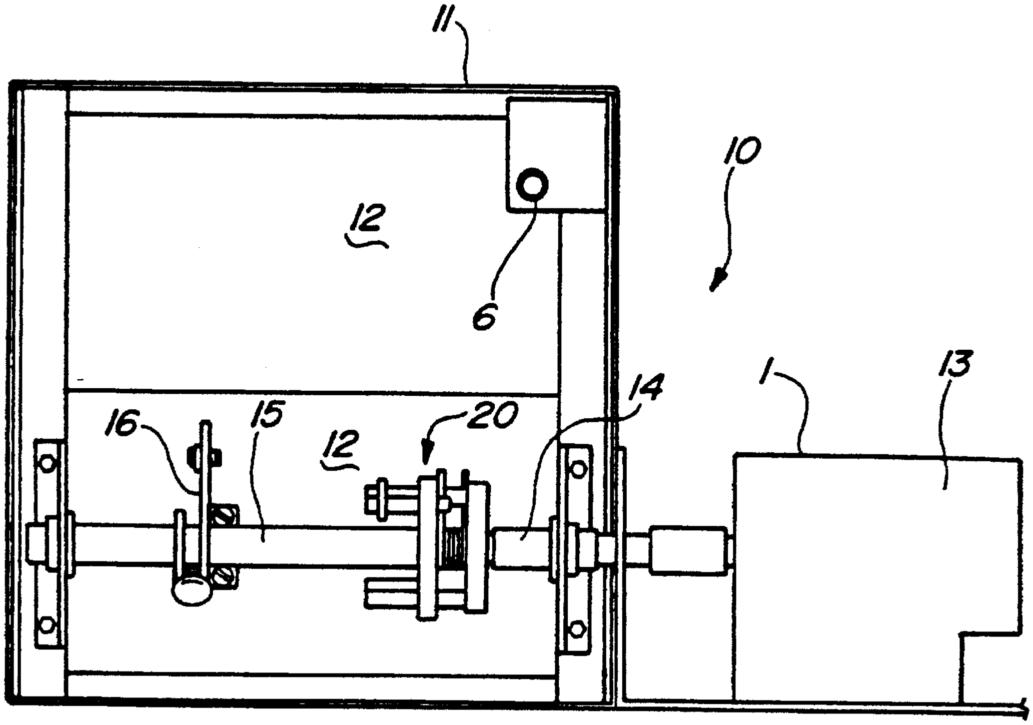
FIG. 1 is a plan view of a smoke / fire damper containing a preferred embodiment of the present invention.

The general layout of a smoke/fire damper assembly 10, including a thermal release coupler 20 according to the present invention, is shown in FIG. 1. The damper assembly includes a frame 11 which carries an array of damper blades 12, interconnected by linkages (not shown). A damper actuator 13 drives the blades between open and closed positions, via a mechanical train consisting of drive shaft 14, thermal release coupler 20, connecting shaft 15 and drive linkage 16. Except for the thermal release coupler, the components, materials and layout of the smoke/fire damper 10 are generally known in the art.

Figure 2:
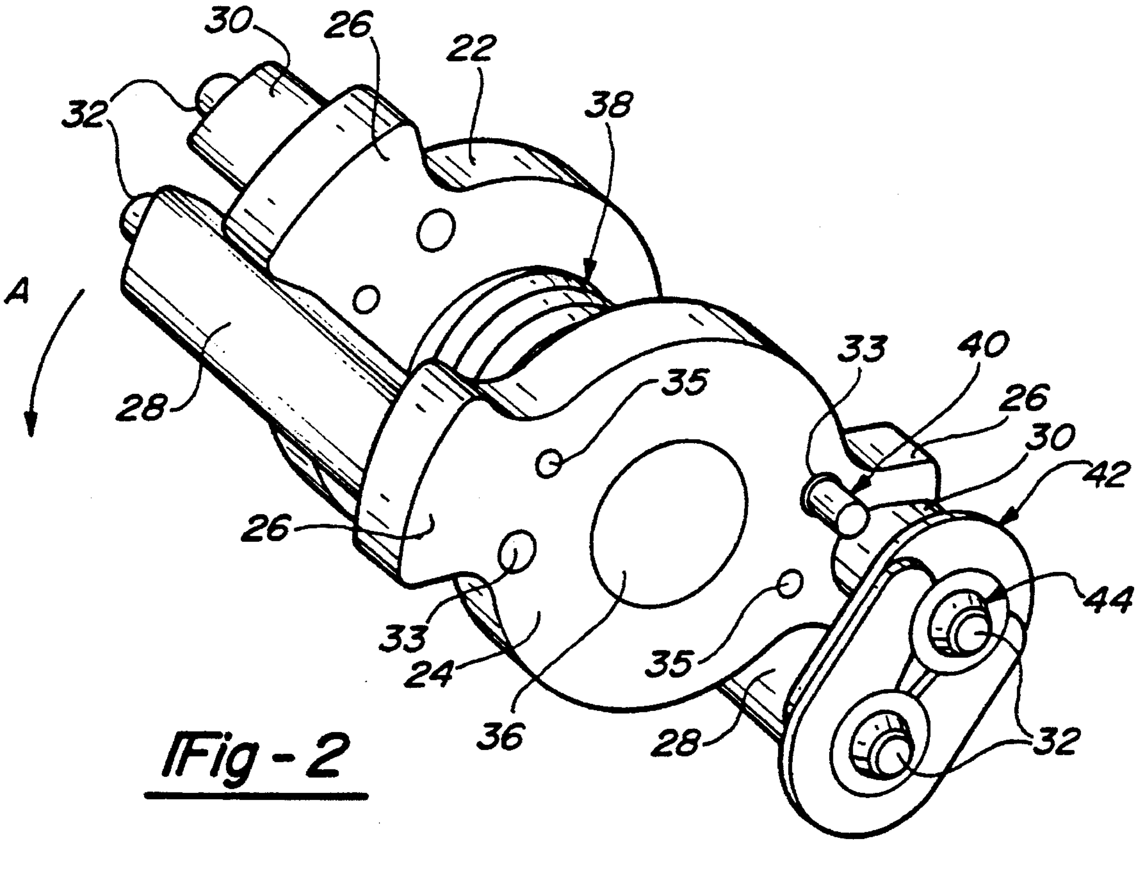

The thermal release coupler of the present invention is best seen in FIG. 2. It should be understood that FIG. 2 illustrates the "normal" position of the coupler unit, as seen in general service. In the presence of fire, as explained below, the unit rotates to an "emergency closed" position.

The body of the device is formed primarily by two identical coupler units, the drive coupler 22 and the connecting coupler 24. Each coupler unit is generally circular, with ears 26 projecting radially outward from the coupler body at 180 degree intervals. One coupler ear carries a drive post 28 extending in one direction perpendicular to the plane of the unit, while the other ear carries a connecting post 30 extending in the opposite direction. Both posts are tipped with mounting pegs 32, extending in the same direction as the respective posts themselves. Dimensioning will be understood more completely after considering the assembly of the completed device, but it can be noted that the connecting post 30 is preferably about ½ inch long, with the drive post 28 being about 3 inches in length. Each coupler unit also has a centrally located aperture, drive shaft aperture 34 on the drive coupler and connecting shaft aperture 36 on the connecting coupler. These apertures are dimensioned to accept drive shaft 14 and connecting shaft 15, respectively. Spring apertures 33 and attachment apertures 35 are also formed in the coupler body in the base of both ears, as explained in more detail below.

Production economies are gained by making both couplers identical, as will be appreciated by those in the art. It is preferred to produce these units by investment casting, from an easily worked, high-temperature, strong material such as stainless steel. The drive shaft and connecting shaft have different diameters, requiring different diameters for the respective apertures, but that requirement can be accommodated by conventional mold inserts. Each coupler unit is carried on its respective shaft, with a press fit augmented, if desired, by set screws or other suitable attachment means. The drive shaft is preferably a solid shaft of about ⅝" diameter, designed to slide inside the connecting shaft, which is hollow, with preferably about ¾" outside diameter. The coupler units are arranged on the shafts so that the drive post 28 of each coupler extends toward the other coupler.

A torsion spring 38 lies between the coupler units, with a spring leg 40 extending longitudinally from each end of the spring through the spring aperture 33 of each coupler unit. Thus, the spring provides torque, urging connecting coupler 24 to rotate from the "normal" position of FIG. 2 in the direction shown by arrow A, toward an "emergency closed" position. The spring is designed to be normally closed; that is, from any position of the damper blades, the spring should drive the blade assembly completely closed. In order to meet safety standards for use as a smoke and fire damper, the spring must provide at least two and one-half times the closing force required to close the damper array. Those in the art will understand the requirement for consulting standards promulgated by Underwriters' Laboratory and other agencies in this field. It has been found that a spring having about 85 inch-pounds of torque is sufficient for most applications. It is preferred to fabricate this spring from 300-series stainless steel.

From this discussion it can be appreciated that the drive posts 28 should be dimensioned so that the drive post mounting pegs of one coupler unit lie coplanar with the connecting post mounting pegs of the other coupler. Thus, the coupler units are under considerable torsional force in the "normal" position of FIG. 2, and they remain in that position only because they are held there by fusible link 42. This component is a ribbon-like device, having apertures or slots designed to accept mechanical connections such as mounting pegs 32, and designed to separate at a rated temperature. Fusible links are well-known in the art, and it is preferred to employ a unit commercially available from the Star Sprinkler Corporation Model A fusible link, located in Milwaukee, Wis. Other sources of similar products are known in the field. It is preferred to offer the completed unit with links having temperature ratings of 165 and 212 degrees F. for fire protection service and 250 and 350 degrees F. when the unit is provided as the secondary closure mechanism in a smoke/fire damper. The fusible link is retained on the mounting pegs by push nuts 44 or other conventional means.

As can easily be seen, the completed thermal release coupler 20 has two drive post/connecting post combinations, but only one is used for carrying a fusible link. Although such an arrangement would appear wasteful at first blush, it has been found that using the same component for both coupler units results in production economies that greatly exceed the small material cost of having unused portions of the couplers.

In operation, the completed coupler assembly 20 is placed into service by rotating the connecting coupler 24 in a direction opposite from that shown by arrow A (against the torque of spring 38), bringing the connecting post 30 of the connecting coupler into alignment with and close proximity to the drive post 28 of drive coupler 22, so that fusible link 42 can be placed over the respective mounting pegs 32 on each post and secured in place with push nuts 44. At that point the unit is ready to operate. It should be noted that the damper assembly 10 can rotate the damper blades 12 without placing any load on damper actuator 13. During normal operation, this reduces the load on the damper actuator, decreasing energy expenditures.

In the event of a fire, elevated temperatures in the vicinity of the damper assembly will cause fusible link 42 to separate, whereupon torsion spring 38 drives the connecting coupler 24 in the direction of arrow A, closing the damper blades. In this "emergency close" position, the damper actuator cannot open the damper blades under any conditions, as the spring keeps the blades completely closed. It has been found that the thermal release coupler of the present invention offers performance advantages over prior art designs, in that the relatively high tension load placed on the fusible link 42 insures that the link melts quickly at its rated temperature, improving the responsiveness of this fire protection device. After the fire emergency has passed, the damper is returned to the "open" position by manually opening the damper blades and positioning a new fusible link on the coupler unit.

If it is desired to employ the thermal release coupler of the present invention as a pure fire damper, offering simply the capability to close the damper at a selected temperature, the damper actuator 13 and the drive shaft 15 could be eliminated and the drive coupler 22 could be attached directly to a fixed portion of the frame 11, either directly or by using a bracket or other suitable fixture, attached to the frame. For that application, the fusible link separation temperature would be chosen at a lower value than that used for the combination situation. Here, the fusible link would separate, allowing the spring 38 to close the damper array, whenever the ambient temperature around the damper assembly exceeded the rated level.

Those in the art will appreciate that a number of modifications can be made to the disclosed embodiment within the spirit of the invention. For example, the particular shape of the coupler units, as well as their materials, is not critical to their performance, and a different application could call for differences in design criteria. These and other modification will occur to those in the art without departing from the scope of the invention, which is defined solely by the claims appended hereto.

We claim:

1. A thermal release coupler employed in a fire and smoke damper assembly, wherein the fire and smoke damper assembly includes an array of damper blades carried in a damper frame, movable between open and closed positions; a linkage joining the damper blades; and a damper actuator operatively connected to the linkage for driving the damper blade array between the open and closed positions; the thermal release coupler comprising a drive shaft operatively coupled to the damper actuator;

a hollow connecting shaft operatively connected to the damper blade linkage and rotatably carried on said drive shaft;

a drive coupler and a connecting coupler, formed from identical coupler units, each said coupler unit including a coupler body, generally circular in form and having two connecting ears projecting radially therefrom at circumferentially opposed locations;

a drive post extending from one said connecting ear, perpendicular to the plane of said coupler body;

a connecting post, extending from the other said connecting ear, perpendicular to the plane of said coupler body in a direction opposite from said direction of said drive post;

mounting pegs carried on the ends of said drive post and said connecting post;

a shaft aperture formed at the central axis of said coupler body; and a spring aperture formed at the base of each said connecting ear;

wherein said drive coupler is secured to and carried on said drive shaft and said connecting coupler is carried on and secured to said connecting shaft, said coupler units being oriented such that said drive post of each said coupler unit extends toward the other said coupler unit, and said coupler units being positioned such that said mounting pegs on one said coupler unit lie coplanar with said mounting pegs on the other said coupler unit;

a torsion spring carried on said connecting shaft and extending between said drive coupler and said connecting coupler, including two spring legs extending longitudinally from each end of said spring and carried in a said spring aperture of said drive coupler and a said spring aperture of said connecting coupler, such that said spring exerts torque on said coupler units in a direction to drive the damper blades to the closed position, said spring legs being positioned such that the unloaded position of said spring urges the damper array to a fully closed position; and fusible link means carried on said drive coupler drive post mounting peg and said connecting coupler connecting post mounting peg to maintain said connecting coupler connecting post in close proximity to said drive coupler drive post.

2. A thermal release coupler employed in a fire damper assembly, wherein the fire and smoke damper assembly includes an array of damper blades carried in a damper frame, movable between open and closed positions;and a linkage joining the damper blades; the thermal release coupler comprising a connecting shaft operatively connected to the damper blade linkage;

a drive coupler and a connecting coupler, formed from identical coupler units, each said coupler unit including a coupler body, generally circular in form and having two connecting ears projecting radially therefrom at circumferentially opposed locations;

a drive post extending from one said connecting ear, perpendicular to the plane of said coupler body;

a connecting post, extending from the other said connecting ear, perpendicular to the plane of said coupler body in a direction opposite from said direction of said drive post;

mounting pegs carried on the ends of said drive post and said connecting post;

a shaft aperture formed at the central axis of said coupler body; and a spring aperture formed at the base of each said connecting ear;

wherein said drive coupler is secured to the damper frame and said connecting coupler is carried on and secured to said connecting shaft, said coupler units being oriented such that said drive post of each said coupler unit extends toward the other said coupler unit, and said coupler units being positioned such that said mounting pegs on one said coupler unit lie coplanar with said mounting pegs on the other said coupler unit;

a torsion spring carried on said connecting shaft and extending between said drive coupler and said connecting coupler, including two spring legs extending longitudinally from each end of said spring and carried in a said spring aperture of said drive coupler and a said spring aperture of said connecting coupler, such that said spring exerts torque on said coupler units in a direction to drive the damper blades to the closed position, said spring legs being positioned such that the unloaded position of said spring urges the damper array to a fully closed position; and fusible link means carried on said drive coupler drive post mounting peg and said connecting coupler connecting post mounting peg to maintain said connecting coupler connecting post in close proximity to said drive coupler drive post.

* * * * *